United States Patent [19]
Butler

[11] 4,212,578
[45] Jul. 15, 1980

[54] APPARATUS FOR RETAINING BALES IN POSITION ON A BALE WAGON

[75] Inventor: L. Dennis Butler, Kingsburg, Calif.

[73] Assignee: Sperry Corporation, New Holland, Pa.

[21] Appl. No.: 891,880

[22] Filed: Mar. 30, 1978

[51] Int. Cl.² .................. A01D 87/12; B65G 57/32
[52] U.S. Cl. .................................. 414/39; 414/546; 414/900
[58] Field of Search ............ 214/6 B, 6 C, 77 R, 214/78, 79, 83.22; 414/38, 39, 40, 44, 900, 546

[56] References Cited

U.S. PATENT DOCUMENTS

| | | | |
|---|---|---|---|
| 1,058,969 | 4/1913 | Hauser | 214/78 |
| 2,372,902 | 4/1945 | Lewis | 214/6 B |
| 3,788,495 | 1/1974 | Fachini et al. | 214/6 B |
| 3,857,498 | 12/1974 | Grey et al. | 214/6 B X |

FOREIGN PATENT DOCUMENTS

| | | | |
|---|---|---|---|
| 868753 | 4/1971 | Canada | 214/6 B |
| 445396 | 6/1975 | U.S.S.R. | 214/6 B |

Primary Examiner—L. J. Paperner
Attorney, Agent, or Firm—John B. Mitchell; Frank A. Seemar; Ralph D'Alessandro

[57] ABSTRACT

An improved bale wagon is disclosed which employs novel apparatus for maintaining the positional integrity of bales in a tier during the transfer thereof from a bale-accumulating table to a load bed. A pair of stationary open frame structures extend from the main frame adjacent the bale-accumulating table upwardly and rearwardly to the respective sideboards on each side of the load bed to provide a retaining wall adjacent the path of travel of the opposing sides of the bale-accumulating table. The retaining structures prevent the outward dislocation of bales during the transfer step, even in steep hillside conditions and thus promote increased operation efficiency.

7 Claims, 1 Drawing Figure

APPARATUS FOR RETAINING BALES IN POSITION ON A BALE WAGON

BACKGROUND OF THE INVENTION

This invention relates generally to bale wagons, and specifically to apparatus for use on a bale wagon to prevent the outward dislocation of bales during the transfer thereof from a bale-accumulating table to a load bed.

It is accepted present day practice to form bales of crop material such as hay or the like into stacks through the employment of an automatic bale wagon. One type of bale wagon which has achieved wide-spread commercial acceptance is the automatic bale wagon which employs the three table concept, as originally illustrated and described in U.S. Pat. No. 2,848,172 which issued to Gordon E. Grey. Many refinements have been made to the Grey bale wagon, such as those shown in U.S. Pat. No. 3,945,507; however, the basic concept has remained substantially the same.

The Grey bale wagon includes a first table which successively receives bales from a bale loader or pickup on the wagon and accumulates a predetermined number of them, for example two, being arranged end-to-end in a row, a second table which successively receives the accumulated rows of bales from the first table and accumulates a plurality of them, such as 4, 5 or 6 rows, which plurality of rows is commonly called a tier of bales, and a third table or load bed which successively receives the tiers from the second table and accumulates a plurality of the tiers for example, 7, to form a stack thereon. Once the stack has been accumulated on the load bed, it may be unloaded by pivoting the load bed 90 degrees and depositing the stack on the ground with the first tier of bales which was previously accumulated on the second table now being the lowermost tier of the stack in contact with the ground surface.

Another type of bale wagon, which is generally shown and described in this disclosure, employs a stationary bale-receiving area which roughly corresponds to the pivotable first table of the Grey-type wagon discussed above. The bale-receiving area and bale-accumulating table are substantially at the same level, and the bales are transferred therebetween by a pusher mechanism in front of the bale-receiving area which engages the bales and displaces them rearwardly onto the forward portion of the bale-accumulating table. A more detailed description of this bale wagon can be found in co-pending U.S. patent application Ser. No. 891,890 entitled "Bale Wagon" filed concurrently herewith in the name of the same inventor and assigned to the same assignee as the instant application. The above-mentioned application is expressly entirely incorporated herein by reference.

Any bale wagon which employs a pivoting bale-accumulating table to deposit a tier of bales on a load bed encounters significant tier stability problems when operating under hilly conditions. The bales of almost any tier pattern, but especially the double rail and center rail tie tier patterns shown in FIGS. 25 and 26 of U.S. Pat. No. 3,945,507, have a tendency to fall outwardly during the transfer step because of the combined forces of gravity and adjacent bale pressures. Whenever a bale moves outwardly beyond the edge of the bale-accumulating table, the opportunity increases for the bale to contact the load bed sideboards so that the outer end of the bale will be sheared off as transfer is completed.

Some bale wagons attempt to overcome these problems by affixing a relatively small side rail along the edges of the bale-accumulating table. While this does reduce the likelihood of bale "fallout", it requires the sideboards on the load rack to be moved outwardly to allow clearance for the rails. The clearance gap allows the bales to shift on the load rack and also allows the rail bales to shift outwardly against the sideboards, resulting in poor stacks.

The invention to be described below completely overcomes the above-noted problems, and results in a much more efficient and versatile farm implement.

SUMMARY OF THE INVENTION

It is an object of the instant invention to provide retainer means on a bale wagon for improving the hillside operation thereof.

It is another object of the instant invention to provide stationary means extending from the main frame under the bale-accumulating table upwardly and rearwardly to the sideboards on the load bed of a bale wagon to provide a retaining wall adjacent the path of travel of the opposing sides of the bale-accumulating table, and thus eliminate, or significantly reduce, bale displacement during the transfer step.

It is another object of the instant invention to provide bale retaining means on a bale wagon which allows minimum spacing between the sideboards on the load bed, thus promoting a more uniform and stable stack.

It is a still further object of the instant invention to provide bale retaining arches extending between the main frame adjacent the sides of the bale-accumulating table and extending upwardly and rearwardly to the sideboards on the load bed.

It is a still further object of the instant invention to provide bale retaining means for a bale wagon which are durable of construction, inexpensive of manufacture, and extremely effective in use.

These and other objects are attained according to the instant invention by providing an improved bale wagon which employs novel apparatus for maintaining the positional integrity of bales in a tier during the transfer thereof from a bale-accumulating table to a load bed. A pair of stationary open frame structures extend from the main frame adjacent the bale-accumulating table upwardly and rearwardly to the respective sideboards on each side of the load bed to provide a retaining wall adjacent the path of travel of the opposing sides of the bale-accumulating table. The retaining structures prevent the outward dislocation of bales during the transfer step, even in steep hillside conditions, and thus promote increased operation efficiency.

BRIEF DESCRIPTION OF THE DRAWINGS

The FIGURE shows a bale wagon with the bale retaining apparatus of the instant invention in position to prevent bale dislocation during transfer from the bale-accumulating table to the load bed.

DESCRIPTION OF THE PREFERRED EMBODIMENT

Figure 1:
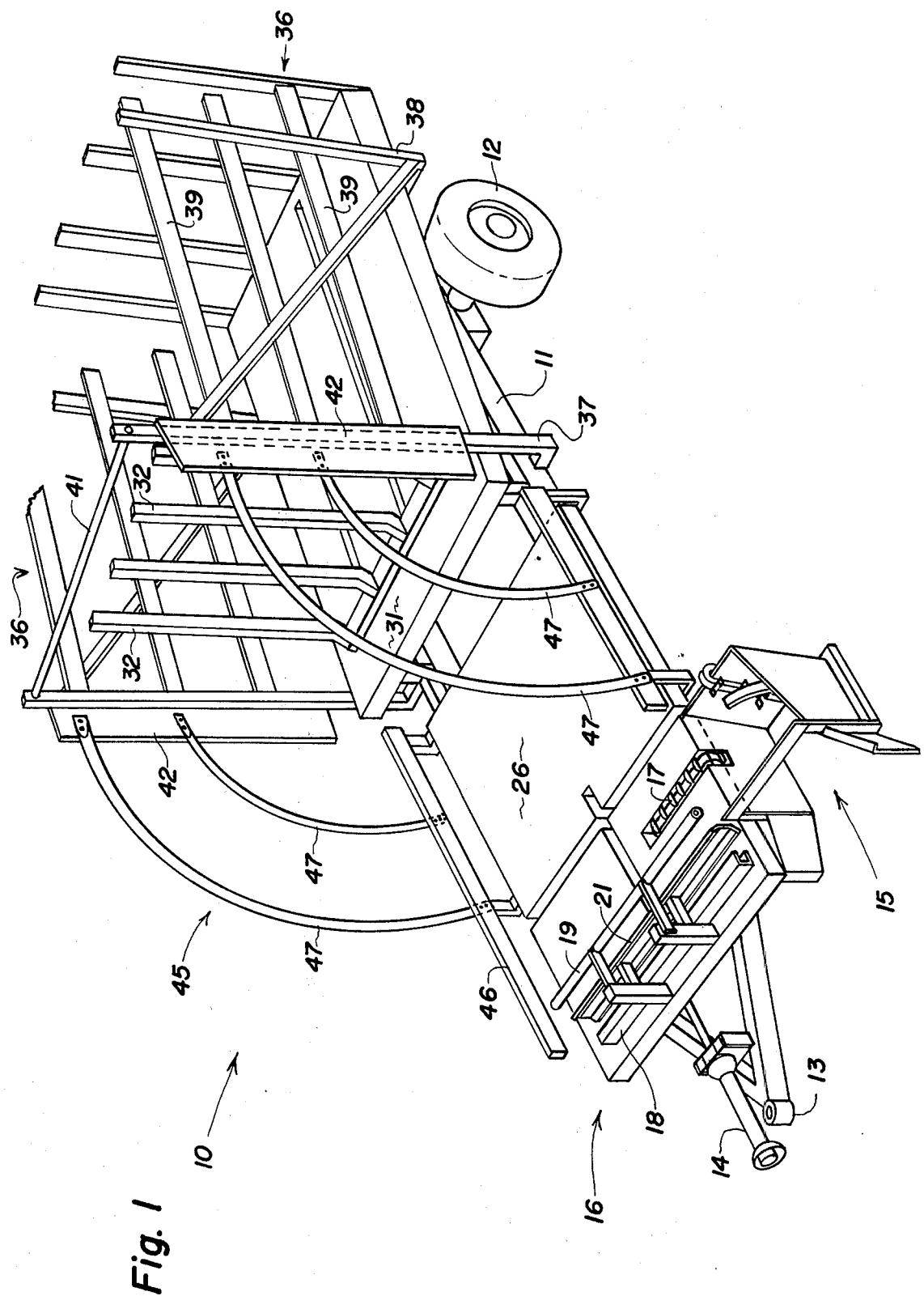

Referring now to the FIGURE, a bale wagon generally denoted by the reference numeral 10 suitable for employing the instant invention is shown. The bale wagon comprises a main frame 11 supported rearwardly by opposing wheels 12, only one of which is shown, and extending forwardly for termination at a hitch 13 by which the wagon may be attached to a tractor or like vehicle. A power take-off 14 may be affixed to the pulling vehicle and used to supply power to the various working parts of the wagon. Alternatively, the bale wagon may be of the self-propelled variety, as taught in the prior art. The specific operating characteristics of the bale wagon are not generally important to the invention to be described; however, the wagon shown employs a first table, or receiving means, 16 spaced forwardly of a second table, or bale-accumulating means, 26 which is in turn spaced forwardly of a third table, or load rack, 31.

As the bale wagon proceeds through the field, bales are engaged by conventional pickup 15 and deposited on the first table 16 and moved serially thereacross by cross conveyor 17. After a predetermined number of bales, usually two, are positioned on the first table, a pusher mechanism 18 engages the bales and pushes them onto second table 26. Under certain circumstances, it is beneficial to turn the bale on the flat, and therefore a turning mechanism comprised of elements 19 and 21 is provided. The specific operation of first table 16 does not form part of the instant invention, but is shown in the above-mentioned co-pending application. In the alternative, a more conventional bale wagon as shown in the above-noted Grey patent may be employed. The process of transferring bales onto the second table 26 is repeated until the table is filled with a tier of bales in any one of a number of forms. At that time, the second table is pivoted upwardly and rearwardly toward the third table 31 so that the tier engages the rolling rack 32 and becomes stable on the load rack. The entire process is repeated serially until the load rack is filled with a stack of bales. Then, the load rack is pivoted upwardly and rearwardly and the bales are deposited on the ground in the form of a stable stack. The stability of the stack being formed on load rack 31 is maintained by a pair of sideboards shown generally at reference numeral 36. Each sideboard comprises a front brace 37, a rear brace 38 and a plurality of side slats extending therebetween. The front and rear braces 37 and 38 are affixed at the bottom thereof to the main frame 11 and may be adjustable laterally therewith if desired. A top brace 41 extends between the two front braces of the opposing sideboards, and may have tines thereon as taught in the prior art. Each front brace of the sideboards may also include a wing 42 which is known in the prior art and is used to assist in guiding the bales on the second table to the third table during the transfer step.

During the transfer step from the second table 26 to the load rack 31, especially in hilly conditions, it is not uncommon for the bales to have a tendency to fall outwardly and become misaligned. If the magnitude of displacement is greater than the available clearance, the bales will engage the front braces 37 and/or wings 42 and be ripped apart. Obviously, this is undesirable and detrimental to the overall efficient operation of the machine. To prevent such bale misalignment, a bale retaining means 45 is provided. Retainer means 45 comprises a pair of similar structures on either side of the second table 26. Horizontal rails 46 are individually affixed to the main frame 11 and are movable relative thereto to accommodate varying sizes of bales or tiers on the table. A plurality of semi-circular tubular structures 47 are affixed at either end to the horizontal rails and the wings 42 of the sideboards 36. As the second table pivots to deposit bales on load rack 31, the outside edges of the bales either engage or are closely spaced inwardly from tubular structures 47 and are thereby guided during the transfer step along the entire path of travel. It should be readily apparent to one of skill in the art that any suitable structure may be employed in place of rails 46 and structures 47. For example, a solid wall could be used, though such would not probably be as cost effective as the structure shown. The adjustability of the retaining means 45 with the edges of table 26 allows the operator of the wagon to make field modifications in accordance with the size of the bales being stacked. Also, the employment of retaining means 45 allows the sideboards 36 to be positioned at the minimum spacing to maintain a more stable stack on the load rack than was heretofore possible. In effect, the retainer means 45 act as a "shoehorn" in directing the bales into a tight tier as the transfer step is being accomplished.

For example, one of skill in the art will readily appreciate that wings 42 are optional. The desired result may be obtained by extending the tubular structures 47 and affixing them to upright braces 37. The wings do, however, maximize the "shoehorn" effect when the sideboards are of a minimum spacing.

Also, for example, it should be understood by one of skill in the art that the functions of tubular structures 47 and sideboards 36 could be combined in a single structure extending uninterrupted along load rack 31 and at least part of second table 26.

It will be understood that various other changes in the details, materials and arrangement of parts which have been herein described and illustrated in order to explain the nature of the invention will occur to and may be made by those skilled in the art, upon a reading of this disclosure, and such changes are intended to be included within the principles and scope of this invention.

Having thus described the invention, what is claimed is:

1. In a bale wagon having a mobile chassis, a load bed pivotably affixed to said chassis, a bale-accumulating table pivotably affixed to said chassis forwardly of said load bed to transfer bales in a tier to said load bed, a bale-receiving means affixed to said chassis, forwardly of said bale-accumulating table, means to transfer bales from said bale-receiving means to said bale-accumulating table, and sideboards affixed to said chassis and extending upwardly adjacent opposing sides of said load bed, said bale-accumulating table having a length substantially equal to the distance from said load bed to said bale receiving means, the improvement comprising:

a pair of retainer means laterally positionally adjustable relative to said bale-accumulating table, said pair of retainer means being affixed to said chassis adjacent the respective sides of said bale-accumulating table and extending upwardly and rearwardly to respective sideboards adjacent said load bed and affixed thereto such that said pair of retainer means substantially defines the outer side limits of the path of pivotal movement of said bale-accumulating table during the transfer of bales to said load bed, each said retainer means encompassing an arcuate path corresponding to the pivotal movement of said bale-accumulating table, said arcuate path having a radius substantially equal to said length of said bale-accumulating table, thereby eliminating outward displacement of bales during said transfer.

2. The bale wagon of claim 1 wherein each one of said pair of retainer means further comprises a plurality of arcuate-shaped spaced apart members of different lengths affixed at opposing ends to said chassis and said sideboards.

3. The bale wagon of claim 2 wherein said arcuate-shaped members are tubular structures.

4. The bale wagon of claim 3 wherein each of said pair of retainer means further includes a substantially horizontal rail affixed to said chassis substantially parallel to the sides of said bale-accumulating table, and said arcuate members are affixed to said rail.

5. The bale wagon of claim 4 wherein said sideboards each include a vertical wing-shaped member affixed to the forward portion thereof, and said retainer means are affixed thereto.

6. In a bale wagon having a mobile chassis, a load bed fixed to said chassis, a bale-accumulating table pivotably affixed to said chassis adjacent said load bed to transfer bales in a tier to said load bed, means to pick up bales and deposit them on said bale-accumulating table and means supported by said chassis adjacent the respective sides of said load bed to limit the outboard movement of tiers of bales on said load bed, said bale-accumulating table having a length dimension extending in a longitudinal direction parallel to the direction of travel, the improvement comprising:

a pair of retainer means affixed to said chassis adjacent the respective sides of said bale-accumulating table and extending upwardly and rearwardly to respective means to limit movement of tiers on said load bed, each said retainer means encompassing an arcuate path corresponding to the pivotal movement of said bale-accumulating table, said arcuate path having a radius substantially equal to said length dimension of said bale-accumulating table, thereby eliminating outward displacement of bales during the transfer thereof to said load bed.

7. The bale wagon of claim 6 wherein said means to limit movement of tiers on said load bed and said pair of retainer means are integral, thus forming a structure on each side of the wagon for preventing outward movement of bales and tiers.

* * * * *